Figure 1:
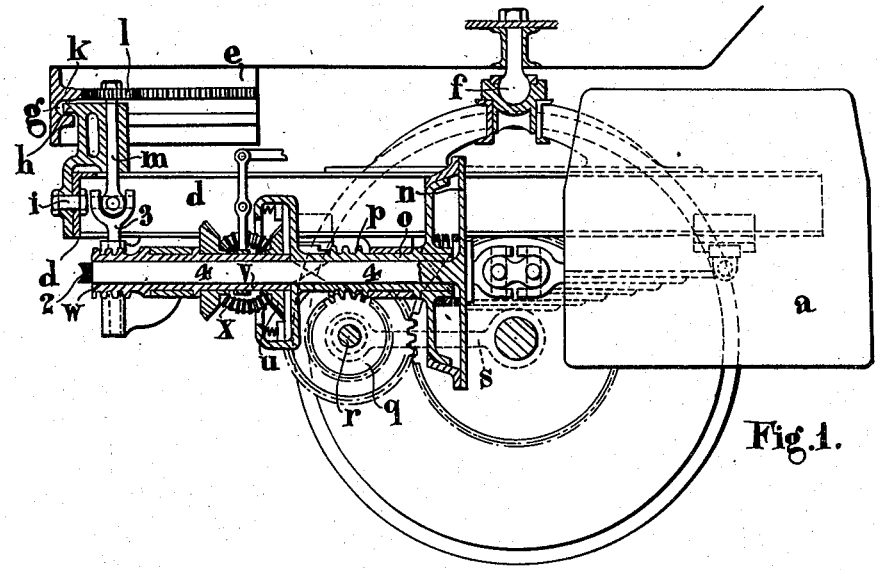

No. 885,014. PATENTED APR. 21, 1908.
A. W. BRIGHTMORE.
FRONT DRIVEN MOTOR VEHICLE.
APPLICATION FILED SEPT. 27, 1906.

2 SHEETS—SHEET 1.

Attest: Inventor.

No. 885,014. PATENTED APR. 21, 1908.
A. W. BRIGHTMORE.
FRONT DRIVEN MOTOR VEHICLE.
APPLICATION FILED SEPT. 27, 1906.

2 SHEETS—SHEET 2.

Attest:
Inventor:

UNITED STATES PATENT OFFICE.

ARTHUR W. BRIGHTMORE, OF BURFORD, EGHAM, ENGLAND.

FRONT-DRIVEN MOTOR-VEHICLE.

No. 885,014.　　　　Specification of Letters Patent.　　　Patented April 21, 1908.

Application filed September 27, 1906. Serial No. 336,458.

*To all whom it may concern:*

Be it known that I, ARTHUR WILLIAM BRIGHTMORE, doctor of science, a subject of the King of Great Britain and Ireland, residing at Burford, Egham, in the county of Surrey, England, have invented certain new and useful Improvements in Front-Driven Motor Road-Vehicles, of which the following is a specification.

This invention relates to motor road vehicles in which the motor and driving gear are mounted in a self-contained manner upon a forecarriage pivotally connected by a ball and socket joint to the main frame of the vehicle which is in addition supported on the rear wheels, the forecarriage being maintained parallel to the main frame longitudinally by a slider or runner pivotally connected to the back of the forecarriage on a horizontal axis in the same vertical plane as the longitudinal axis of the forecarriage, the slider working on a circular track or raceway attached to the main frame of the vehicle.

In the previous forms of motor vehicle of this type steering was effected by varying the relative velocities of the two front road wheels by applying brakes to brake drums on either side of the differential gear, the power required for steering being taken from the motor.

One object of the present invention is to still utilize the power of the motor or of an auxiliary motor to effect the steering but to accomplish the steering by a more positive method than that hitherto adopted so as to render the steering less affected by the varying road resistance and at the same time to leave the two axles free to move in vertical planes absolutely independently of each other. This is accomplished according to the present invention by providing teeth on the circular track mounted on the main frame, and adapting a pinion (carried by the slider) driven by the motor or an auxiliary motor, to mesh therewith; a suitable clutch and controlling gear being interposed between the motor and pinion to enable the steering to be effected as desired.

As the result of experiments with front driven vehicles it is found that some form of clutch between the forecarriage and the main frame of the vehicle is necessary in order to prevent the direction of the vehicle, particularly at slow speeds, being altered by obstacles on the road, or by the occurrence of softer places on the road under one driving wheel than under the other.

I have discovered and confirmed by experiments on front driven vehicles that the introduction of a clutch between the slider attached to the forecarriage and the circular track attached to the main frame, renders the vehicle impracticable except when the slider is pivoted to the forecarriage in one particular position because horizontal vibration of the forecarriage, particularly when traveling over rough sets, is caused, owing to the irregularities of the road tending to cause the portion of the clutch carried by the forecarriage to have a horizontal motion relative to the portion of the clutch carried by the main frame, due to the two axles not always lying in the same plane.

The one position (the neutral position) of the pivot pin attaching the slider to the forecarriage, which involves there being no appreciable tendency to relative motion between the slider and segmental track due to varying inclination in vertical planes of the two axles is at a height equal to that of the center of the ball and socket joint between the forecarriage and the main frame, when the vehicle is loaded, multiplied by the ratio of the horizontal distance of the pivot pin (in its central position) from the back axle to the horizontal distance between the axles; and the height of the pivot pin must not differ materially from this amount. In other words the "neutral" point has the same motion, due to alterations in the vertical inclination of the two axles, whether considered as attached to the main frame or to the forecarriage. If a spur-wheel on a spindle carried by the slider is used for steering as described above, it is rotated by the engine or motor or an auxiliary motor. The worm drives a worm wheel on the same spindle as the spur pinion, but the worm-wheel cannot drive the worm, therefore any obstacle on the road cannot twist the vehicle. Thus the worm and worm wheel constitute a clutch, for without rotation of the worm the spur wheel on the same spindle as the worm wheel cannot rotate and therefore cannot travel on the segmental track, consequently there can be no motion between the slider, which carries the spur wheel, and the segmental track. Thus, when steering is not taking place, the slider becomes in effect part of the main frame. As the position of the pivot pin attaching the slider to the forecarriage is so chosen that it has the same motion, whether considered as part of the main frame or of the forecarriage, owing to alterations in vertical inclination of the axles, it is obvious that any tendency to relative motion between the slider and segmental track due to irregularities of the road, is avoided.

Figure 2:
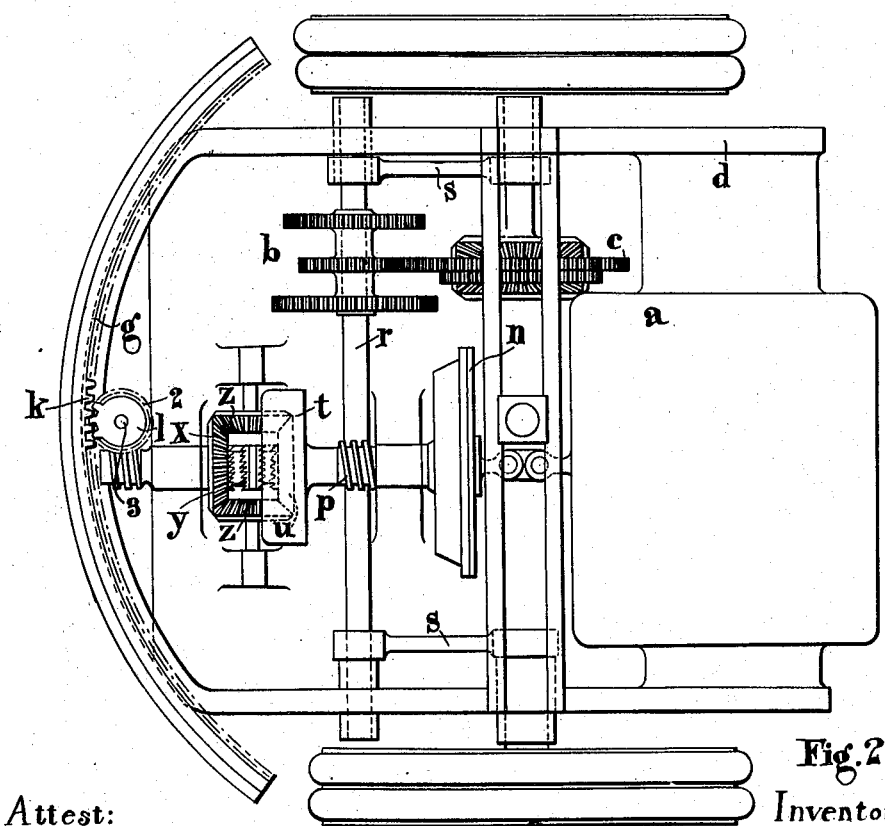
Figure 3:
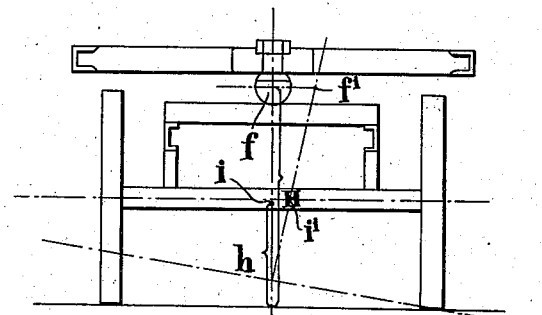
Figure 4:
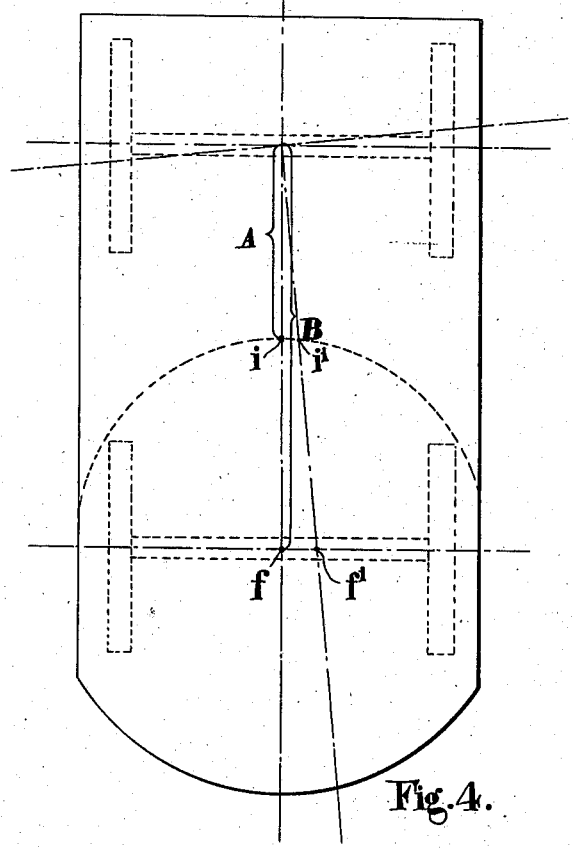

Referring now to the accompanying drawings, Figure 1 is a sectional elevation of the forecarriage of a front driven motor vehicle. Fig. 2 being a plan; Figs. 3 and 4 are diagrammatic front and plan views illustrating the relation between the heights of the slider pivot pin and the ball and socket pivot of the forecarriage and the distances between the pivot pin and axles.

In carrying the invention into effect according to one mode, the motor, $a$, any suitable change speed gear, $b$, and differential gear, $c$, are mounted upon the frame, $d$, of the forecarriage which is pivoted to the main frame, $e$, by a ball and socket joint, $f$.

A segmental race or track, $g$, is fitted on the main frame, $e$, of the vehicle and a slider, $h$, is adapted to slide therein, the slider being pivoted on a horizontal pivot pin, $i$, on the frame, $d$, of the forecarriage. A segmental rack, $k$, is formed on the segment race, $g$, and a pinion, $l$, is adapted to mesh therewith the pinion being mounted on a vertical shaft $m$, carried by the slider, $h$. The pinion, $l$, is driven from the motor, $a$, as hereinafter described in one direction or the other so as to effect the steering.

The motor, $a$, is connected by a universal coupling to one member of a clutch, $n$, adapted to engage another member capable of sliding on a key on a sleeve, $o$, having a worm, $p$, driving a worm wheel, $q$, on the shaft, $r$, of any suitable type of change speed gear, $b$, the latter driving the road wheels through the differential gear, $c$. The shaft, $r$, is connected by radius rods, $s$, to the front axle to maintain the wheels in mesh notwithstanding the working of the springs. The shaft, 4, is also formed or fitted with a member, $t$, of a clutch adapted to drive by friction a wheel, $u$, normally running loose on a sleeve, $v$, connected with or integral with a worm, $w$. The wheel, $u$, is capable of being clutched to the sleeve, $v$, by a jaw, sliding on a key on $v$, or other clutch, $x$, so as to drive the sleeve in one direction; or of being allowed to run free driving a wheel, $y$, rotating freely on $v$ through wheels, $z$, in the reverse direction the latter wheel being similarly capable of being clutched to the sleeve, $v$, by the same clutch. Thus by suitable manipulation of the clutch, $x$, the sleeve may be left stationary or run in either direction as desired. The sleeve drives the pinion $l$, through the worm, $w$, and a worm wheel 2, mounted on a vertical shaft, 3, connected by a universal coupling to the pinion shaft, $m$. The shaft, 3, and the pinion shaft, $m$, thus rotate together, as one spindle, but have a universal joint opposite the pivot pin, $i$. The steering may thus be positively effected by suitable manipulation of the clutch, $x$, and the worm, $w$, and worm wheel 2, form a clutch between the forecarriage and race or main frame of the vehicle.

It is to be understood that any other suitable form of clutch may be used instead of the jaw clutch for effecting the steering; and other form of reversing the direction of turning the forecarriage instead of the bevel wheels, $u$, $y$, $z$.

The slider $h$ may be assumed as a part of the main frame of the vehicle whatever its position on the circular segment may be whenever the forecarriage is not being rotated relatively to the main frame for steering purposes. Assume therefore that the slider is fixed relatively to the main frame. If then one of the front wheels mounts an obstacle (or the other falls into a depression) the front axle moves in a plane at right angles to the pin $i$, and the ball $f$ is moved through a distance $ff'$. (See Figs. 3 and 4). The pin $i$, as part of the forecarriage is moved a distance equal to $ff' \times \dfrac{h}{H}$. The pin $i$ as part of the main frame is moved a distance equal to $i$, $i'=ff'\times\dfrac{A}{B}$ because the movement of the ball from $f$ to $f'$ turns the vehicle body about the center point between the rear wheels. Since $\dfrac{h}{H}$ is made equal to $\dfrac{A}{B}$, the pin $i$ is relatively at rest because it moves the same distance as part of the forecarriage and as part of the main frame and the resultant effect of the front wheel mounting the obstacle is a rotation of the forecarriage in the vertical plane of the front axle about $i$, (plus the translation of that point).

In brief what is required is a position for the pin $i$ in which the movement it derives from the frame is identical with that which it derives from the forecarriage, when the front axle is tilted, and this position is that before referred to as the "neutral" position and is obtained by making the ratio of the height of the pin and the height of the ball joint equal to the ratio of the distance of the pin from the center of the back axle and the distance of the ball joint from the same.

Having now described my invention, what I claim as new and desire to secure by Letters Patent is:—

1. In a motor propelled vehicle of the type referred to, a segmental race and rack on the vehicle under-frame, a slider engaging said race and pivoted on the forecarriage at the "neutral" position, a pinion meshing with the rack and fixed on a spindle carried by the slider, a second spindle connected to the former by a universal joint, a worm wheel on the second spindle, a worm meshing therewith and means for driving the same, substantially as hereinbefore set forth.

2. In a motor propelled vehicle of the type referred to, a segmental race and rack on the vehicle under-frame, a slider engaging said race and pivoted on the forecarriage at the "neutral" position, a pinion meshing with the rack, a spindle for said pinion carried by the slider, a worm wheel on said spindle, and a worm meshing therewith and means for connecting the same with the motor mounted on the forecarriage substantially as hereinbefore set forth.

3. In a motor propelled vehicle of the type referred to, a segmental race and rack on the vehicle under-frame, a slider engaging said race and pivoted on the forecarriage at the "neutral" position, a pinion meshing with the rack and fixed on a spindle carried by the slider, a second spindle connected to the former by a universal joint, a worm wheel on the second spindle, a worm meshing therewith and means for connecting the same with the motor mounted on the forecarriage, said connecting means comprising a clutch and reversing gear substantially as hereinbefore set forth.

4. In a motor propelled vehicle of the type referred to, a segmental race and rack on the vehicle under-frame, a slider engaging said race and pivoted on the fore-carriage at the "neutral" position, a pinion meshing with the rack and fixed on a spindle carried by the slider, worm gear for driving said spindle, means for connecting said worm gear with the motor mounted on the fore-carriage and comprising a clutch and reversing gear, and change speed mechanism mounted on the fore-carriage and adapted to transmit motion from the motor to balance gear on the front road axle, substantially as hereinbefore set forth.

In testimony whereof I affix my signature in presence of two witnesses.

ARTHUR W. BRIGHTMORE.

Witnesses:
BERTRAM H. MATTHEWS,
REGINALD I. M. KELLY.